United States Patent [19]

Otte

[11] 3,848,164

[45] Nov. 12, 1974

[54] CAPACITIVE ELECTRICAL CONNECTORS

[75] Inventor: Richard F. Otte, Los Altos, Calif.

[73] Assignee: Raychem Corporation, Menlo Park, Calif.

[22] Filed: July 11, 1972

[21] Appl. No.: 270,812

[52] U.S. Cl. ............... 317/256, 317/261, 333/24 C, 339/176 MP

[51] Int. Cl. ............................................ H01g 1/035

[58] Field of Search .. 339/94 M, 17 L, 1 LC, 1 LM, 339/176 MP; 317/256, 257, 261; 174/72 B; 333/24 C

[56] References Cited

UNITED STATES PATENTS

| | | | |
|---|---|---|---|
| 1,621,000 | 3/1927 | Crowley | 339/94 M |
| 2,334,660 | 11/1943 | Webster | 317/257 X |
| 2,445,256 | 7/1948 | Page | 317/257 X |
| 3,400,303 | 9/1968 | Rowlands | 174/72 B |
| 3,453,007 | 7/1969 | Roland | 339/94 M |

*Primary Examiner*—E. A. Goldberg
*Attorney, Agent, or Firm*—Lyon and Lyon

[57] ABSTRACT

Electrical connectors, such as of a type useful for connecting circuit cards or modules to other electronic equipment, are disclosed herein. An exemplary connector includes an electrically conductive block adapted to be physically and electrically coupled with a circuit board and removably connected with respect to a second electrically conductive block. The latter block is adapted to be coupled to various electrical conductors, such as coaxial cables, ground and power plugs, or the like. The blocks are mounted in capacitive relationship and are also electrically connected to provide a direct current path.

9 Claims, 8 Drawing Figures

CAPACITIVE ELECTRICAL CONNECTORS

The present invention relates to electrical connectors and more particularly to electrical connectors employing capacitive coupling to carry a shield signal. Such connectors are useful, for example, for interconnecting circuit boards and associated electronic equipment and the like.

In electronic equipment there presently is a trend to utilize faster signals (e.g., 1 nanosecond rise time) and to transmit such signals through interconnections which are, to some degree, impedance matched, perfect matching being impossible. This has resulted in a need for connectors that are also impedance matched and will handle the signals involved without distortion, but yet which can be manufactured and used easily. As is known, many signals are transmitted from point-to-point through coaxial cables that are characterized by circular symmetry, as well as by other impedance controlled transmission lines. Typical coaxial cables include an insulated center conductor and an outer conductive shield. A make-break connecting method that will connect coaxial cable or other transmission lines to circuit boards with a fair degree of impedance match and that is versatile enough to work with variable center spacing, contact arrangements and transmission lines would be particularly useful. One difficulty in providing such connectors is the problem of electrically carrying through the shield or ground signal of a transmission line, this signal being a distinct signal from that carried by the signal line itself. With coaxial cable, a common form of transmission line, the conventional and obvious solution is to make some type of plug and socket for the shield that is similar to that used with the center conductor of the coaxial cable. The following discussion is in terms of a coaxial transmission line, but the concepts disclosed herein are useful with other lines as well. Although there seems to be no currently known practical way to avoid the use of the plug and socket for the center contact, the same is not true of the shield. According to one of the concepts described herein, an approach has been found that allows the electrical continuity of the shield to be maintained, but which is quite simple mechanically and can be easily manufactured and used.

Accordingly, it is a principal object of the present invention to provide an improved electrical connector.

An additional object of this invention is to provide an improved electrical connector for carrying the shield or ground signal associated with one or more signal paths.

A further object of this invention is to provide a connector having good electrical transmission properties with a geometry that is simple to implement.

These and other objects and features of the present invention will become better understood through a consideration of the following description taken in conjunction with the drawings in which:

FIG. 45B is a side cross-sectional view thereof;

Figures 1A, 1B, 2, 3:
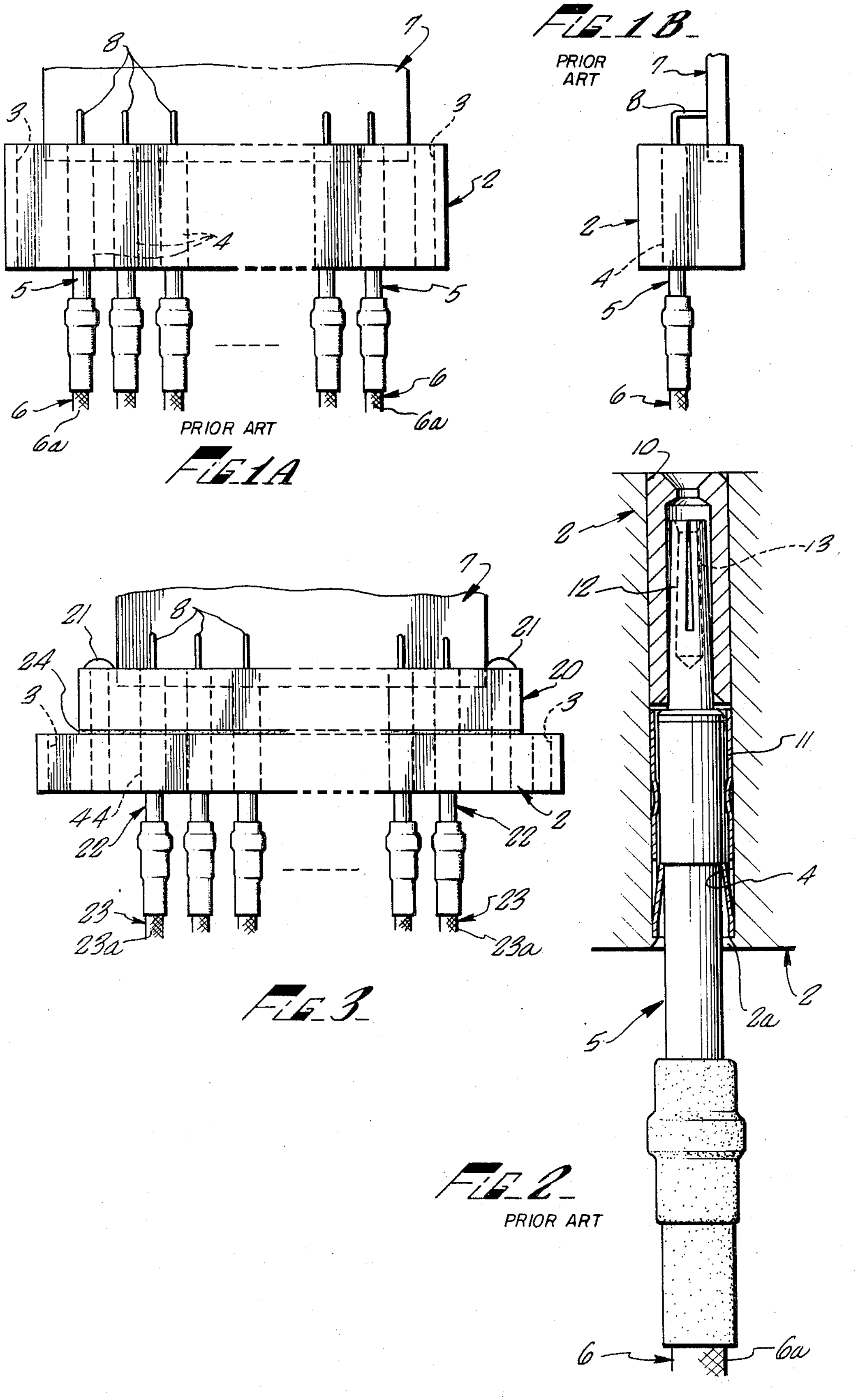
FIG. 1A is a diagramatic view of a conventional one piece frame connector, and a circuit card or board connected therewith.
FIG. 1B is a side view thereof.
FIG. 2 is a more detailed partial cross-sectional view of a conventional one piece connector.
FIG. 3 is a diagramatic view simlar to FIG. 1A but with the addition of a card block according to the concepts of the present invention.

Turning now to the drawings, and first to FIG. 1, a conventional frame connector 2 is illustrated which is a metal block and includes apertures 3 to enable the same to be mounted to the frame of electrical equipment involved. This connector further includes a plurality of apertures shown diagramatically at 4, such apertures including a retaining system in the form of suitable clips or other retaining devices for receiving and holding plugs 5. These plugs may be coupled with coaxial cables 6, or other suitable cables, connected with the block. Typical plugs 5 also include ground plugs and power plugs. A conventional circuit board or card 7 has a plurality of pins 8 forming the edge connectors of the board 7. As is known to those skilled in the art, the pins 8 of the card 7 are secured to the card and electrically connected with components and/or circuits on the board. The board 7 may be plugged into the connector 3 to thereby physically join the two and electrically interconnect the pins 8 with the appropriate cables 6.

Figures 4A, 4B, 5, 6:
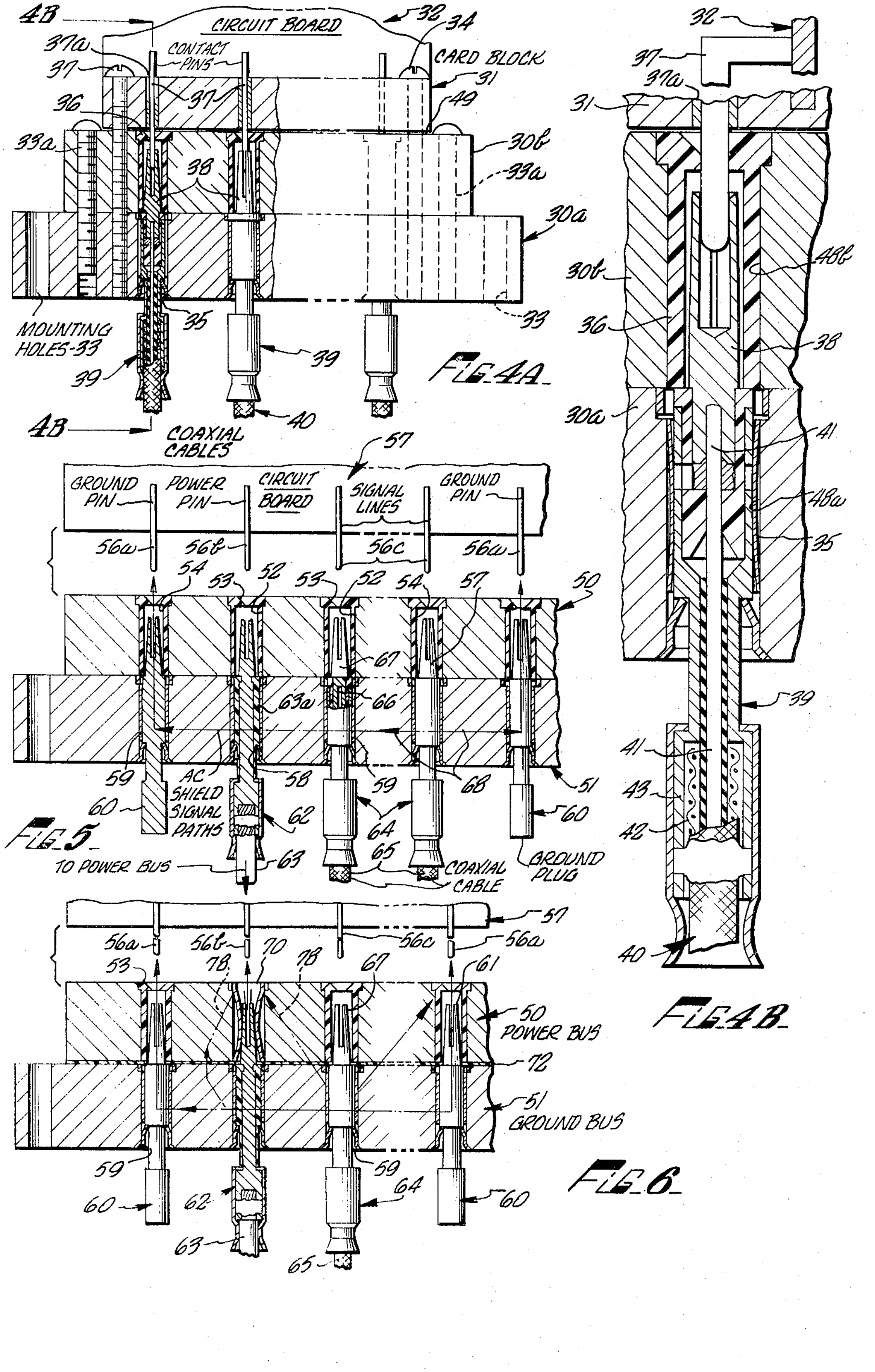
FIG. 4A is a more detailed cross-sectional view of an embodiment of the connector arrangement of FIG. 3.
FIG. 5 is a detailed cross-sectional view of a frame connector of the nature of that shown in FIG. 1 but split into two parts.
FIG. 6 is a similar cross-sectional view of a connector of the nature of that of FIG. 5 but incorporating further concepts of the present invention.

FIG. 2 is a partial cross-sectional view of an exemplary construction of a connector 2, the retaining system thereof and one coaxial plug 5, it being noted that more plugs typically are used with a full connector. The block 2 has an aperture 4, to provide a pin hole or guide, with a substantially cylindrical insulator 10 and a retaining clip 11 therein. The coax contact or plug 5 is inserted into end 2a of the guide hole 4, and is retained in the connector 2 by the clip 11. The forward end of the plug 5 is in the form of a center pin 12 having an aperture 13 in the end thereof for receiving one of the pins 8 of the card 7. A more detailed cross-sectional view of the plug 5 is shown in FIG. 4B and will be discussed subsequently.

Other types of connectors or plugs, such as ground plugs, power plugs and the like, also may be used with the block or connector 2 as noted earlier in the discussion of FIG. 1. The guides 4 and clips 11 receive these plugs or the like, and the clips 11 serve to retain the plug in the connector 2, and in come cases electrically couple the plug with the connector 2. Other contacts of this nature will be described subsequently in conjunction with a description of FIGS. 4 and 5, but typically three types of such plugs are used with connectors of the nature of connector 2; namely, ground plugs, which electrically couple circuit board pins to the connector block 2; power plugs which couple board pins to power wires associated with the connector 2 and which are insulated from the connector 2; and coaxial plugs which couple a cable shield to the connector 2 and couple a center conductor thereof to a signal pin 8 of the card 7.

In use, the pins 8 of the circuit board 7 are always plugged into the connector 2 and mated with the plugs 5, with the latter plugs always being coupled with the connector 2. In operation, electrical signals on the shield 6a of the coaxial cable 6 go to the ground plane on the circuit board 7 through the retaining clips or springs 11, the body of the connector 2 and ground plugs associated with ground pins of the card 7. These latter plugs are similar to the plugs 5 and will be explained in more detail subsequently. The circuit board 7 also has a power plane to which certain pins 8 thereof are connected and which is electrically common with the ground plane for a.c. shield signals.

Turning now to the present concepts, and first to FIG. 3, the same generally illustrates a connector or block 2 like that shown in FIG. 1 and a similar circuit board or card 7 with pins 8 thereon. In addition, another block 20, also of metal, is provided and is affixed to the card 7. The pins 8 of the card 7 are insulated from the block 20 by insulators, such as the insulator 10 of FIG. 2. The blocks 20 and 2 are physically and electrically interconnected by means of any suitable mechanical devices which hold them together and provide a complete direct current (d.c.) path. Conventional ground plugs may be used, or bolts 21 as shown in FIG. 3. The adjacent faces of the blocks 20 and 2 are spaced apart as indicated at 24 thereby forming a capacitor, and preferably this area includes a layer of dielectric material as discussed later.

With the arrangement of FIG. 3, shield electrical continuity from coaxial cables to the card is attained thorugh the use of two mechanisms. The first is a path for the d.c. and the other low-frequency components which is achieved through the coupling devices 21 which interconnect the blocks 2 and 20. This path can be, and is, a long path around the ends of the connector assembly through the metal plates or blocks 2 and 20 and the coupling devices 21 that hold the blocks 2 and 20 together. High frequency components cannot travel this path without causing serious deterioration of the electrical signal. The continuity of these high frequency components results from a second mechanism used to electrically connect the shields; that is, the shield 23*a* of coaxial cable 23 to the shield (not shown) of the circuit board 7. This mechanism is capacitive coupling between the two metal blocks 2 and 20. One of the blocks 2 is mounted on the rack of the electrical equipment, and the other block 20 is attached to the ground plane on the circuit board card 7. The center conductor of a coaxial cable 23 and center pin of the coax plug 22 extend through the hole 4 and couple with an associated pin 8 of the card 7. The center pin of the coax plug is insulated from the block 2 and the pin 8 is insulated from the block 20 by suitable insulators similar to the insulators 10 in FIG. 2. Thus, the center conductor of the coaxial cable 23, the center pin of the coax plug 22 and the associated pin 8 are surrounded by the connector assembly 2 and 20 to retain the desirable circular symmetry and shielding. Further details of this assembly, and features thereof will be discussed below.

FIGS. 4A and 4B illustrate an exemplary embodiment of a connector assembly which was generally illustrated in FIG. 3. These former figures illustrate a rack connector or block 30*a*–30*b* and a card block 31, all three of metal, and a conventional circuit board 32. Mounting holes 33 are provided in the lower frame block 30*a* for physically mounting the latter block on the electrical equipment involved. The blocks 30*a* and 30*b* are secured together by suitable fasteners, such as bolts 33*a*. The card block 31 is secured to the circuit board 32 in any suitable manner. The frame blocks 30*a* and 30*b* are physically and electrically connected to the card block 31 by means of connectors 34, or any other suitable mechanical devices which hold these blocks together and provide a complete direct current (d.c.) path as noted earlier between the card block 31 and frame block assembly 30*a*–30*b*. The retention system for the frame block assembly 30*a*–30*b* includes spring clips 35 mounted in the lower block 30a and insulators 36 mounted in the upper block 30b. The clips 35 and insulators 36 are similar to and perform the same function as the clips 11 and insulators 10 of FIG. 2. The frame block assembly 30*a*–30*b* acts in concert with the card block 31 to form a capacitance at 49 which carries the high frequency components of shield or ground signals. It is desired that the blocks 30*a*–30*b* not be separated or disconnected when the circuit board 32 and card block 31 assembly is removed from the frame block assembly 30*a*–30*b*. Thus, blocks 30*a*–30*b* are integrally connected together by the connectors 33*a* as noted above, and are not normally separated except during initial manufacturing and assembling, or for repair. The circuit board 32 includes contact pins 37, similar to pins 8 on card 7 of FIG. 1, and these pins are electrically connected with center pins 38 of coax connectors or plugs 39 which are connected to coax cables 40. The contact pins 37 are insulated at 37*a* from the card block 31.

Turning again to the coax cables 40, the same have a center conductor 41 and an outer shield 42 as is well known. The shield 42 is soldered to the body 43 of the plug 40, and the center conductor 41 is soldered to the pin 38. The connector 39 is retained in the block 30*a* by the retaining clip 35, and the center pin 38 is insulated from the block 30*b* by the insulation member 36. Although not shown in FIG. 4, ground plugs and power plugs also typically are used with the frame block assembly 30*a*–30*b* to provide electrical connections respectively with the ground plane and power plane of the circuit board 32 in the manner noted earlier. Plugs of this nature are shown in FIGS. 5 and 6 and will be discussed subsequently.

Shield electrical continuity with the assembly of FIG. 4, as in FIG. 3, is obtained by providing a d.c. path through the coupling devices 34, and providing continuity for high frequency components by capacitive coupling. The capacitive coupling provides electrical continuity of the high frequency signals from the cable shields to the ground plane of the circuit board. The center conductor 41 of the coax cable and the center pin 38 of the connector 39 go through holes 48*a*and 48*b* (note FIG. 4B) of the respective blocks 30*a* and 30*b*, and the pins 37 go through holes in the card block 31, and are surrounded by the connector portions to retain the desired circular symmetry and shielding. In order to obtain the desired electrical effects through capacitive coupling, it is necessary that the two adjacent metal faces of the blocks 30*b* and 31 match well. The faces must be parallel to each other and slightly spaced apart as indicated at 49, but should be as close together as possible. It is desirable to have them spaced approximately 0.001 inch apart, but this is difficult to achieve inasmuch as it is difficult to achieve this small a separation over the entire surface of both faces. A spacing of 0.005 inch is more readily attainable and has proven to be satisfactory. Ordinarily both surfaces will be flat planes although curvelinear or other face configurations are operable. With an area of several square inches in this close proximity, the capacitive coupling between the rack mounted block 30*b* (which is electrically attached to the shields 42 of the cables 40) and the card mounted block 31 will be sufficient to carry the high frequency shield signals. The combined use of this high frequency path, and a low frequency path (through the coupling devices 34) achieves shield continuity through the connector, yet makes it possible to easily mate and break, or disconnect, the connector. The connection and disconnection operations are similar to those of conventional ones; they differ critically in that the faces of a pair of blocks (30*b* and 31) are placed in close proximity when the connector blocks are mated and pins or plugs need not be mated for each individual shield.

A greater number of cables to be connected from the rack equipment to the circuit board or circuit boards, requires a greater area for the connector involved and, thus, the resultant capacitive coupling also is greater. The present concept therefore is more effective for larger numbers of conductors or connectors with higher center spacing. The capacitive coupling can also be increased by including a polymer of high dielectric constant between the blocks 30*b* and 31 at 49 where the capacitive coupling action occurs. This will raise the capacitance, improve the coupling, and allow this technique to work with less area of close proximity between the blocks. Furthermore, any of several methods of providing the d.c. connection at the ends, edges, or in the center can be used. The possibilities include conventional plug and socket contacts, screws (such as shown at 34 in FIG. 4A), or roll pins. The choice depends on various factors, among them frequency of mating and the degree of proximity required of the two block faces.

Success of the above connector requires that the amount of capacitive coupling and the length of the d.c. paths be matched so that there is some overlap between the frequency components that each can carry with good "fidelity." This requires that the length of the d.c. path be short (preferably less than 0.1 wavelength) compared with the lowest frequency that the capacitive coupling can carry without a significant decrease in its amplitude. Stated differently, the length of the d.c. path should be less than 0.1 of the wavelength of the low frequency cutoff point of the capacitive coupling mechanism.

In addition to the present concepts being used for a printed board type of connector, this same multiple dc/ac path approach can be used with rack and panel connectors, circular connectors, and so forth. It appears that it is most useful with large numbers of conductors as noted earlier.

The present technique of achieving shield continuity is simpler than other technqiues that effectively have a plug and socket arrangement for each shield. A contact between the coax shield and board ground on each cable is not required, yet electrical characteristics are similar. Reliability is greater inasmuch as there is redundancy in both d.c. and high frequency connections and mate-break shield contacts are not used, manufacturing cost is lower, and insertion force of the board is lower. All of the shield connections are made to the board when the board 32 and card block 31 are mechanically and electrically connected with the frame block assembly 30*a*–30*b*. Connections to the cable shields 42 are made when the connector 39 for the cable 40 is inserted into the lower or rear block 30*a*.

While the discussion above with respect to FIGS. 4A and 4B is directed principally to the present connector concept of using capacitive coupling to carry a shield signal or signals, a related concept involving certain advantages in shortening the path for a.c. shield signals is illustrated in FIG. 6. The arrangement of FIG. 6 also improved electrical properties of coaxial connectors and in a related fashion; however, it involves principally shortening the shield signal path as will be explained below in a discussion of FIGS. 5 and 6.

Turning first to FIG. 5, the same essentially illustrates a conventional connector like connector 2 of FIG. 1 but with the connector split into two halves 50 and 51. Also, the particular retention system used in the two-half connector of FIG. 5 is slightly different from that used in FIG. 2. The purpose of splitting the connector into two halves, as will be explained in greater detail later, is to allow one half to be at one potential, such as ground, and the other half to be at another potential, such as the power voltage for the circuit board; otherwise, the connector, circuit board and plugs shown in FIG. 5 are conventional, but it is believed that a discussion of the same will facilitate an understanding of the FIG. 6 embodiment.

The upper or "front" block 50 generally includes a plurality of pin holes or guides 52 having substantially cylindrical insulators 53 therein. The insulators 53 include holes 54 for receiving pins 56 forming the edge connectors of a circuit board 57. In some instances, the insulators 53 are formed on and coupled with the pins 56 and board 57, rather than being a part of the upper block 50.

The lower or "rear" block 51 generally includes a plurality of pin holes or guides 58, most of which include retaining springs 59 therein. These guides and springs receive suitable contacts in the form of pins, plugs and the like of the nature noted previously, with the retaining springs 59 serving to both retain the contacts and electrically couple the same with the block 51. Typically, three types of contacts can fit into the holes in the block assembly 50–51; namely, ground plugs 60, which coupled circuit board pins 56a to the block 51; power plugs 62, which couple board pins 56b to a power wire 63, and which are insulated from both of the blocks 50 and 51 by insulation 63a and 53; and coaxial contacts 64, which couple a cable shield 65 to both of the blocks 50 and 51; and couple the center conductor 66 thereof through a center pin 67 to signal board pins 56c.

In use, electrical signals on the coax shield 65 go to the ground plane on the circuit board 57 as diagramatically indicated by dashed lines 68 through the springs 59 to the block assembly 50–51 and through ground plugs 60 associated with the ground pins 56*a* of the circuit board. The circuit board 57 also has a power plane to which the power pins 56b are connected and which is electrically common with the ground plane for a.c. shield signals.

Turning again to FIG. 6, the arrangement is quite similar to that of FIG. 5 and like reference numbers generally are used. An upper or "front" retaining block 50 of metal serves as a power bus, a lower or "rear" retaining block 51 of metal serves as a ground bus. The blocks 50 and 51 are like blocks 50 and 51 of FIG. 5. The circuit board 57 includes contact pins like those of the circuit board in FIG. 5, and includes ground pins 56a, power pins 56*b*, and signal pins 56*c*. Also shown are gound plugs 60 which are insulated from block 50 and which hook the board pins 56*a*to the ground bus 51; and coax connectors or plugs 64 which connect the shield of the coax cable 65 to the ground bus 51 and connect the center conductor of the coax cable 65 through a socket 67 to the appropriate associated board pin 56. The coax connectors may be like those shown in FIG. 4B. Additionally, a power contact 70 is provided which may be in the form of a metal retaining spring pressed into the power bus 50. The contact 70 electrically connects a power pin 56*b* of the board 57 to the power bus 50 and to a power plug 62 which is insulated from the ground bus 51. This differs from the arrangement of FIG. 5 wherein the power plug 62 is insulated from both blocks 50 and 51. Also, the two blocks 50 and 51 are not direct current coupled, as with connector blocks 2 and 20 of FIG. 3 and blocks 30b and 31 of FIG. 4.

The arrangement of FIG. 6 involves the use of the front block 50 as the power bus in conjunction with one or more contacts 70 pressed into the block 50, and allows the elimination of some parts, saves space, and saves the labor involved in installing the eliminated parts. A further advantage is that the two buses 50 and 51 have a large amount of capacitive coupling between the adjacent faces of the buses 50–51. This large capacitive coupling results from the close proximity at 72 of the face over a large area (for example, 2 ½ × 7 inches), and preferably a layer (for example 0.003 to 0.005 inch) of insulation material, such as polymide (sold by du Pont under the name Kapton), at 72 between the blocks 50 and 51. The resulting electrical capacity is great enough to act as an a.c. short circuit between blocks 50 and 51 for high frequency signals. Not only does this minimize noise on the power bus 50, but also allows a.c. shield signals to travel to the power bus 50 from the ground bus 51 as indicated by dashed lines 78 in FIG. 6. Once such signals are on the power bus 50, they can go to the ground plane of the circuit board 57 through the contacts 70 and the power pins 56*b*, and through the capacitive coupling that exists on the circuit board 57 between the ground and power planes thereof.

The ability of the a.c. shield signals to go to the board ground through the power pins 56b provides a new path for these signals in addition to that through the ground plug 60. This is beneficial because it is greatly desirable to have the shortest path possible for a.c. shield signals in order to minimize both the distance and inductance that they encounter in going from the coax cable shield to the circuit board ground plane. Short paths imply low inductance, and low inductance minimizes the impedance discontinuity between the cable shield and circuit board. Short paths also imply small loops for the return signals and thus, in turn, minimize inductively coupled crosstalk between any pair of signals going from the coax cable to the board. Minimizing these two characteristics is of value in certain electrical equipment where signal fidelity is of importance.

From the foregoing it will be apparent that new concepts in the electrical connector art have been presented. The concepts are related, one being the use of capacitive coupling along with direct current coupling, for simultaneously carrying shield signals and d.c. signals, and the other involving an arrangement for shortening the path for a.c. shield signals. The latter employs the bus and power distribution system for carrying the a.c. shield signal to the board ground plane to thereby shorten this signal path and attain the advantages noted.

The present embodiments of this invention are to be considered in all respects as illustrative and not restrictive, the scope of the invention being indicated by the appended claims rather than by the foregoing description, and all variations which come within the meaning and range of equivalence of the claims therefore are intended to be embraced therein.

What is claimed is:

1. An electrical connector for providing a make-and-break connection between first electrical apparatus having a first set of electrical signal conductors, at least one of which comprises a common voltage node of said first electrical apparatus, and second electrical apparatus having a second set of electrical signal conductors, at least one of which comprises a common voltage node of said second electrical apparatus, comprising first electrically conductive block means for electrical connection to the voltage node of said first electrical apparatus, second electrically conductive block means including means for electrical connection to the voltage node of said second electrical apparatus, said first and second block means being physically mounted together with adjacent surfaces thereof separated only by a dielectric but closely contiguous to one another and forming a capacitance for providing capacitive coupling for carrying an alternating current signal from the voltage node of said second electrical apparatus to the voltage node of said first electrical apparatus, and at least another of the first signal conductors being electrically connected to at least another of the second signal conductors when said first and second block means are so mounted together, and coupling means electrically connecting together said first and second block means for providing a direct current path therebetween.

2. An electrical connector as in claim 1 wherein said adjacent surfaces of said first and second block means are substantially flat and parallel and have a spacing therebetween up to approximately 0.010 of an inch.

3. An electrical connector as in claim 1 wherein said dielectric comprises a layer of insulation material between said adjacent surfaces of said first and second block means.

4. An electrical connector as in claim 1 wherein said dielectric compises a layer of high dielectric material between said adjacent surfaces of said first and second block means.

5. An electrical connector as in claim 2 wherein said dielectric comprises a layer of insulation material between said adjacent surfaces of said first and second block means.

6. An electrical connector for electrically connecting an electrical device with electrical equipment comprising first electrically conductive block means for coupling with an electrical device by pins of said device, said first block means having a first face, second electrically conductive block means including means for coupling by pins and the like to electrical equipment, at least one of said pins including a connector having a conductor for conveying an alternating current shield signal or ground signal to said second block means, and said second block means having a first face, said first and second block means being physically mounted together with their first faces closely contiguous to one another separated only by a dielectric and forming a capacitance for carrying an alternating current shield or ground signal therebetween, and coupling means electrically connecting together said first and second block means and providing a direct current path therebetween.

7. An electrical connector for electrically connecting an electrical device with electrical equipment comprising first electrically conductve block means for coupling with an electrical device by pins of said device, said first block means having a first face, second electrically conductive block means including means for coupling by pins and the like to electrical equipment, at least one of said pins including a connector having a conductor for conveying an alternating current shield signal or ground signal to said second block means, and said second block means having a first face, said first and second block means being physically mounted together with their first faces closely contiguous to one another separated only by a dielectric and forming a capacitance for carrying an alternating current shield or ground signal therebetween, a layer of insulation between said first faces of said first and second block means, and coupling means electrically connecting together said first and second block means and for providing a direct current path therebetween.

8. An electrical connector for electrically interconnecting two electrical devices comprising a first electrically conductive block for coupling with contact pins of an electrical device such as a circuit board or the like, said first block being electrically coupled with a ground plane of said electrical device, and said first block having a first face, a second electrically conductive block having guides for receiving plugs, at least some of which includes coaxial cable plugs, and said second block having a first face physically mounted closely contiguous to said first face of said first block and separated only by a dielectric to form a capacitance serving to convey alternating current shield signals from the shield of a coaxial cable connected with a coaxial cable plug through said second block to said first block and from there to said ground plane, said dielectric comprising a layer of insulation between said first faces of said first and second blocks, and coupling means electrically connecting together said first and second blocks and providing a direct current path therebetween.

9. An electrical connector for providing a make-and-break connection between first electrical apparatus having a first set of electrical signal conductors, at least one of which comprises a ground plane of said first electrical apparatus, and second electrical apparatus having a second set of electrical signal conductors, at least one of which comprises a ground plane of said second electrical apparatus, comprising, first electrically conductive block means for electrical connection to said ground plane of said first electrical apparatus, second electrically conductive block means including means for electrical connection to the ground plane of said second electrical apparatus, said first and second block means being physically mounted together with adjacent surfaces thereof separated only by a dielectric, but closely contiguous to one another, and forming a capacitance for providing capacitive coupling for carrying an alternating current signal from the ground plane of said first electrical apparatus, and at least another of the first signal conductors being electrically connected to at least another of the second signal conductors when said first and second block means are so mounted together, and coupling means electrically connecting together said first and second block means for providing a direct current path therebetween.

* * * * *